US010990981B2

(12) United States Patent
Nelms et al.

(10) Patent No.: US 10,990,981 B2
(45) Date of Patent: *Apr. 27, 2021

(54) SYSTEM AND METHOD FOR MOBILE-INITIATED IN-STORE RETURN OF PRODUCTS

(71) Applicant: Walmart Apollo, LLC, Bentonville, AR (US)

(72) Inventors: David Martin Nelms, Rogers, AR (US); Bradley J. Kieffer, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/145,893

(22) Filed: Sep. 28, 2018

(65) Prior Publication Data

US 2019/0108525 A1   Apr. 11, 2019

Related U.S. Application Data

(60) Provisional application No. 62/565,742, filed on Sep. 29, 2017.

(51) Int. Cl.
| G06Q 20/40 | (2012.01) |
| G06Q 20/18 | (2012.01) |
| G06Q 30/00 | (2012.01) |
| G06Q 20/20 | (2012.01) |
| G06Q 20/32 | (2012.01) |
| G07F 7/06 | (2006.01) |
| G06Q 20/04 | (2012.01) |

(52) U.S. Cl.
CPC ......... *G06Q 20/407* (2013.01); *G06Q 20/047* (2020.05); *G06Q 20/18* (2013.01); *G06Q 20/208* (2013.01); *G06Q 20/327* (2013.01); *G06Q 30/016* (2013.01); *G07F 7/06* (2013.01)

(58) Field of Classification Search
CPC .............................. G06Q 20/407; G06Q 20/18
USPC ........................................................ 705/39
See application file for complete search history.

(56) References Cited

U.S. PATENT DOCUMENTS 8,082,183 B2   12/2011   Chowdhary et al.
8,156,007 B1    4/2012   Anthony et al.
(Continued)

OTHER PUBLICATIONS

Neil Nisperos, How to return a holiday gift bought online, Dec. 25, 2016, Inland Valley Daily Bulletin, Ontario, California; Los Angeles Newspaper Group. 3 pages / Dec. 25, 2016. (Year: 2016).*

(Continued)

*Primary Examiner* — Benjamin S Brindley
(74) *Attorney, Agent, or Firm* — Duane Morris LLP; Manita Rawat (57) ABSTRACT

Systems and methods for mobile-initiated in-store return of products are provided. An example system can include: an order management module (OMM) configured to store in a first database completed transactions and associated electronic receipts for customers; a mobile device having a mobile application installed thereon and configured to query and receive from the OMNI selection of products for return; a return management module (RMM) configured to apply rules to validate the return based on the information about the selected product; and a return station configured to verify and complete the return.

20 Claims, 5 Drawing Sheets

(56) References Cited

U.S. PATENT DOCUMENTS

| | | | |
|---|---|---|---|
| 8,380,584 B2 | 2/2013 | Siegel | |
| 8,676,653 B2 * | 3/2014 | Argue | G06Q 20/047 |
| | | | 705/17 |
| 9,015,070 B2 * | 4/2015 | Grigg | G06Q 20/3276 |
| | | | 705/28 |
| 9,292,824 B1 | 3/2016 | Freeman | |
| 9,692,738 B1 | 6/2017 | Wenneman et al. | |
| 10,002,341 B2 * | 6/2018 | Schenken | G06Q 10/08355 |
| 10,430,753 B2 * | 10/2019 | Felix | G06Q 10/0831 |
| 2009/0012704 A1 | 1/2009 | Franco et al. | |
| 2009/0271265 A1 | 10/2009 | Lay et al. | |
| 2015/0066752 A1 * | 3/2015 | Phillips | G06Q 20/22 |
| | | | 705/40 |
| 2015/0186841 A1 * | 7/2015 | Sar | G06Q 10/0837 |
| | | | 705/304 |
| 2015/0254666 A1 * | 9/2015 | Agasti | G06Q 20/322 |
| | | | 705/39 |
| 2016/0042351 A1 * | 2/2016 | Syed | H04W 4/021 |
| | | | 705/39 |
| 2016/0132891 A1 * | 5/2016 | MacKinnon | G06K 5/00 |
| | | | 705/44 |
| 2016/0350757 A1 * | 12/2016 | Bolling | G06Q 20/202 |
| 2017/0293916 A1 | 10/2017 | Humphrys et al. | |
| 2018/0114228 A1 * | 4/2018 | Singh | G07F 7/06 |
| 2018/0225623 A1 | 8/2018 | Mosier et al. | |
| 2018/0349846 A1 * | 12/2018 | Sever | G06K 7/10861 |

OTHER PUBLICATIONS

International Search Report and Written Opinion dated Nov. 26, 2018, issued in corresponding PCT Application No. PCT/US2018/053524.

* cited by examiner

SYSTEM AND METHOD FOR MOBILE-INITIATED IN-STORE RETURN OF PRODUCTS

BACKGROUND

1. Technical Field

The present disclosure relates to return of products in stores. More specifically, the present disclosure relates to systems and methods for mobile-initiated in-store return of products based on user identifications and electronic receipts.

2. Introduction

For retail stores who also offer online shopping, customers can purchase products both from the stores and online. However, when return of products arises, customers are usually required to bring the products to the stores for the return. One of the issues associated with in-store return of product is long waiting lines at customer service desks in stores, in addition to reviewing and presenting receipts for the products. This increases store operational costs and reduces customer's satisfaction as well.

What is needed are systems and methods for efficiently facilitating return of products in stores.

SUMMARY

Disclosed herein are systems for mobile-initiated in-store return of products via a mobile application based on user identifications and electronic receipts associated with the products, which overcome at least some drawbacks known in the art. An example system for mobile-initiated in-store return of products can include an order management module (OMNI). The OMNI is configured to: store completed transactions and associated electronic receipts for customers in a first database; and store pending transactions for the customers in the first database. The example system can also include a mobile device having a mobile application installed thereon. The mobile device is configured to: query the OMNI for transactions; receive from the OMNI selection of products associated with a user identification for return; and receive from the OMNI information about a selected product for the return. The example system can further include a return management module (RMM). The RMM is configured to: apply rules to validate the return based on the information about the selected product; send an update to the OMM to set a flag with the selected product indicating that the return is staged; and store information about the return in a second database. The example system can also include a return station. The return station is configured to: verify the user identification; query the OMNI for products with flags; filter the flags to locate the selected product. The example system can further include a remote return service server (RRSS). The RRSS is configured to: retrieve the information about the return from RMM; and send the information about the return to the return station.

Another exemplary system for mobile-initiated in-store return of a purchased item through a mobile application based on a user identification and an electronic receipt associated with the purchased item. The exemplary system can include a portable device having the mobile application installed thereon. The portable device is configured to: launch the mobile application based on the user identification; determine from a first database, via the mobile application, the purchased item for the in-store return; receive from the first database, via the mobile application, the electronic receipt of the purchased item; associate, via the mobile application, the electronic receipt with the purchased item; generate from a second database, via the mobile application, validating information associated with the in-store return; save, via the mobile application, return information to the second database, the return information including at least one of the purchased item, the electronic receipt, or the validating information; and direct, via the mobile application, a user associated with the user identification to a return location in a store, the user returning the purchased item in the store. The exemplary system can also include a return station (self-service or assisted) positioned in the return location in the store. The return station is configured to pair with the portable device; receive the return information; print a return label to be placed by the user on the purchased item; and receive the labeled purchased item. The exemplary system can further include a computing device associated with the first database. The computing device is configured to: receive an input indicative of receipt of the labeled purchased item; and update the first database to indicate that the labeled purchased item is received. The portable device is further configured to: receive, after updating the first database, a first notification indicating that the in-store return is being processed; and receive, after the in-store return is finished, a second notification indicating that the in-store return has been completed.

A method implemented by a computer system for a mobile-initiated in-store return of a purchased item through a mobile application based on a user identification and an electronic receipt associated with the purchased item is provided in this disclosure. The computer system can include a portable device having the mobile application installed thereon, a return station (self-service or assisted) positioned in a return location in a store and, and a computing device. The method can include: launching the mobile application based on the user identification; determining from a first database, via the mobile application, the available purchased items for the return; receiving from the first database, via the mobile application, the electronic receipt of the purchased item; generating from a second database, via the mobile application, validating information associated with the in-store return; saving return information to the second database, the return information including at least one of the purchased item, the electronic receipt, or the validating information; directing, via the mobile application, a user associated with the user identification to the return location in the store, the user returning the purchased item in the store; pairing the portable device with the return station; receiving, by the return station, the return information; printing, by the return station, a return label to be placed by the user on the purchased item; receiving, by the return station, the labeled purchased item; receiving, by the computing device, an input indicative of receipt of the labeled purchased item; updating the first database to indicate that the labeled purchased item is received; receiving by the portable device, after updating the first database, a first notification indicating that the in-store return is being processed; and receiving by the portable device, after the in-store return is finished, a second notification indicating that the in-store return has been completed.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of this disclosure are illustrated by way of an example and not limited in the figures of the accompanying drawings, in which like references indicate similar elements and in which.

DETAILED DESCRIPTION

Various configurations and embodiments of the disclosure are described in detail below. While specific implementations are described, it should be understood that this is done for illustration purposes only. Other components and configurations may be used without parting from the spirit and scope of the disclosure.

The concepts and embodiments described herein are provided to facilitate in-store return of products/items via a mobile application based on customer/user identifications and electronic receipts associated with the products. The mobile application is configured with a method for identity confirmation and receiving electronic receipts. As used herein, the terms "product" and "item" are interchangeable and all refer to goods purchased by customers.

Figure 1:
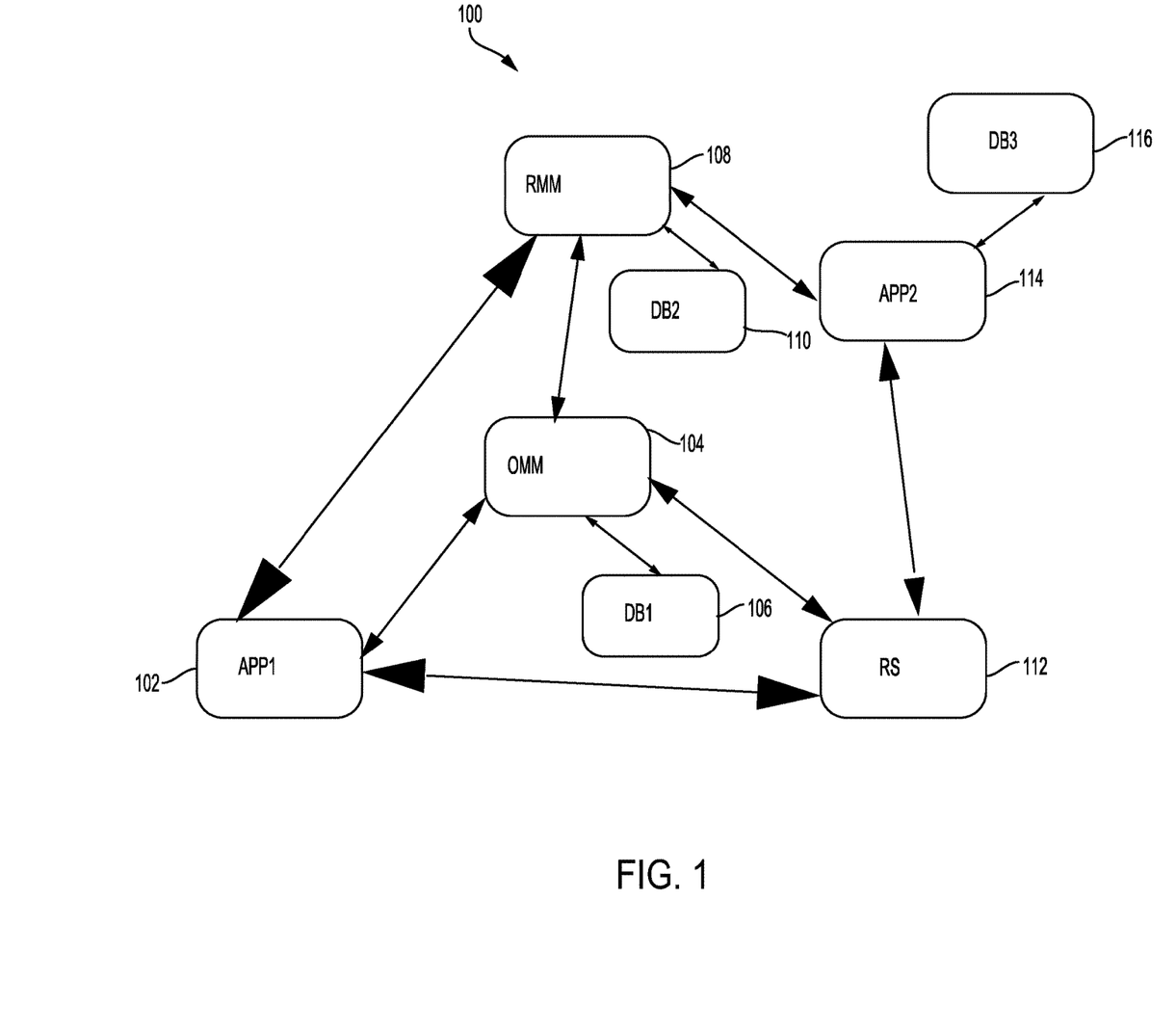
FIG. 1 illustrates a system for mobile-initiated in-store return of products according to one example embodiment.

FIG. 1 illustrates a system 100 for mobile-initiated in-store return of products. The system 100 comprises a first computing device 102 having a software application (i.e., APP1) installed thereon. The first computing device 102 may be a smart phone, a computing tablet, a laptop computer, a desktop computer, or any other portable device. The APP1 may be a mobile application configured for online shopping by a customer. The customer may launch the APP1 by using a user identification and a password, and review and receive electronic receipts associated with the customer's online transactions via the APP1.

In some embodiments, the first computing device 102 may further be configured to digitalize a paper copy of transaction receipt by converting the paper receipt to a corresponding electronic receipt, and to associate the corresponding electronic receipt with products in that transaction. For example, in a situation where a transaction is completed in a store and the customer is issued a paper receipt for products in that transaction, by launching the APP1 using the user identification and password, the paper receipt may be scanned or photographed and then further processed via the APP1 to associate the converted electronic receipt with the products in that transaction occurred in stores.

The system 100 can comprise an order management module (OMM) 104. The OMM 104 is configured to store in a first database (DB1) 106 completed transactions and associated electronic receipts for customers under customer's accounts (user identifications and passwords) set up via the APP1. The OMNI 104 can further be configured to store in the first database pending transactions associated with the customers' accounts. The OMNI 104 may embody any suitable computing hardware combined with software applications. For example, the OMNI 104 may include, but is not limited to, a desktop computer, a laptop computer, or a mainframe, on which operating systems and application software are run to implement functions of the OMNI 104.

When a customer wants to return a product, the customer can launch the APP1 on the first computing device 102 by logging in to his/her account. The first computing device 102 can query via the APP1 the OMNI 104 for transactions associated with the customer's account, and receive a selection of the product to be returned. Specifically, the customer may be presented a listing of products in completed and pending transactions list associated with the customer's account, for example, a dropdown listing, a table, or a spreadsheet. The customer may then select or determine one or more products he/she wants to return, for example, by clicking on the one or more products. The first computing device 102 may receive from OMNI 104 information on the selected product to be returned, such as the electronic receipt associated with the selected product, date and time of purchase, location of purchase, a payment method (e.g., credit card, check, gift card, debit card, or cash), or the like. The communication between the first computing device 102 and the OMM 104 can be any suitable communications channel, for example, a WIFI network, a wired network, a Bluetooth link, or the like.

The system 100 can also include a return management module (RMM) 108. The RMM 108 is configured to communicate with the first computing device 102. The communication between the first computing device 102 and the RMM 108 can be any suitable communications channel, for example, a WIFI network, a wired network, a Bluetooth link, or the like. The RMM 108 may apply return rules/policy to validate the return eligibility based on the information about the selected product. The rules may include, but are not limited to, "food is not eligible for return", "electronic device is invalid for return after 30 days from the date of purchasing", "no return for items is allowed beyond 90 days from the date of purchasing", or the like. That is, validating return information about the return can be generated. The validating information may include the selected product, the electronic receipt, a reason for the return and/or a refund method (e.g., refund to credit card, refund as a gift card, refund to a bank account, etc.) The validating information may be further stored in a second database DB2 110. The RMM 108 may further be configured to send an update to the OMNI 104 to flag the entry in the first database DB1 106 to indicate that a product has been staged for return. The communication between the OMNI 104 and the RMM 108 can be any suitable communications channel, for example, a WIFI network, a wired network, a Bluetooth link, or the like.

The RMM 108 may embody any suitable computing hardware combining with software applications. For example, the RMM 108 may include, but is not limited to, a desktop computer, a laptop computer, or a mainframe, on which operating systems and application software are run to implement functions of the RMM 108.

The system 100 can further include a return station (RS) 112 located in a return location in a store. After staging the return, the customer may bring the selected product to the store for return. Upon arriving at the store, the customer can be directed, via the APP1 on the first computing device 102 carried with the customer, to the return location where the RS 112 is placed. For example, the APP1 may detect a global positing system (GPS) position of the first computing device 102, or a network connection by the first computing device 102 to a local WIFI network in the store. Such detection can signal that the customer has arrived in the store, and a notification is sent to the first computing device 102 to direct the customer to the return location.

The RS 112 may be further configured to pair with the first computing device 102. Upon arrival at the RS 112, the customer may pair the first computing device 102 with the RS 112, for example by scanning a quick response (QR) code on the first computing device 102. The paring may also be performed via a near field communication, a WIFI network, or a Bluetooth link between the first computing device 102 and the RS 112. Once being paired, the RS 102 is configured to verify the user identification.

When the user identification is verified, the RS 112 may further query the OMNI 104 for products with flags associated with the user identification. The RS 112 may further apply a flag filter to locate the selected products for the return from among the other flags set for the customer.

The RS 112 may embody any suitable computing hardware combining with software applications. For example, the RS 112 may include, but is not limited to, a desktop computer, a laptop computer, or a mainframe, on which operating systems and application software are run to implement functions of the RS 112. The RS 112 may also be in a form of a kiosk, a point of sale (POS), or a point of customer service (POCS). The communication between the OMNI 104 and the RS 112 can be any suitable communications channel, for example, a WIFI network, a wired network, a Bluetooth link, or the like.

The system 100 may further comprise a remote return service server (RRSS) 114 running an application APP2 and connecting to a third database DB3 116. The RRSS 114 can be configured to retrieve the information about the return from the RMM 108, and send the information about the return to the RRSS 114. The DB3 116 may store sales, inventory, customer financial information, customer names, customer addresses, and the like.

The RRSS 114 may embody any suitable computing hardware and/or software applications. For example, the RRSS 114 may include, but is not limited to, a desktop computer, a laptop computer, or a mainframe, on which operating systems and application software are run to implement functions of the RRSS 114. The RRSS 114 may also embody a cloud-based module, which can be accessed from the Internet using any Internet browser. The communication between the RMM 108 and the RRSS 114 can be any suitable communications channel, for example, a WIFI network, a wired network, a wide area network, a Bluetooth link, or the like. Similarly, the communication between the RS 112 and the RRSS 114 can be any suitable communications channel, for example, a WIFI network, a wired network, a wide area network, a Bluetooth link, or the like.

In some embodiments, the RS 112 may be configured to receive the return information about the selected product from the first computing device 102. For example, after paring with the RS 112, the first computing device 102 may transfer the return information to the RS 112. The RS 112 may also receive the return information directly from the RMM 108.

The RS 112 may further be configured to print out a return label to be placed by the customer on the returned product. For example, once the user identification is verified and the return information is confirmed, a return label may be printed out so the customer can place the label on the returned product. The RS 112 may also have features to receive the labeled product. For example, the RS 112 may be configured to have one or more receiving box or cabinet so the customer can drop the labeled product in the receiving box or cabinet.

In some embodiments, the RS 112 may receive from the RMM 108 returning information for an additional product to be returned that was staged previously and validate against the return rules or policy the returning information for the additional product for return eligibility. For example, the customer may select two products for return when coming to the store. One of the selected products may be staged for return a quite long time ago. At the time when this product was staged, the product was eligible for return. However, the customer may forget to bring the product to the store for timely return. So for this additional product, the RS 112 retrieves the previously staged return information and validates the return information against the rules to check if this additional product is still be eligible for return.

In some embodiments, the RS 112 may be configured to have a customer stage onsite a product for return. For example, the customer may not have enough time to stage the product for return before coming to the store for the return. In this scenario, the RS 112 may allow the customer to generate return information onsite. For example, upon verifying the user identification of the customer, the RS 112 may present a listing of products associated with the user identification for the customer to select which product to return. The listing of products is received from the OMNI 104. The customer selects a product for return from the listing, and the RS 112 is further configured to validate the return by applying the rules for return eligibility via communicating with the RMM 108.

In some embodiments, the RSS 112 may further configured to issue a refund for the returned product to a financial account associated with the user identification. The financial account may be saved on the DB3 116.

In some embodiments, the system 100 may further comprise a second computing device (not shown in FIG. 1). The second computing device can be configured to communicate with the OMNI 104, and may embody any suitable computing hardware and/or software applications. For example, the second computing device may include, but is not limited to, a smart phone, a computing tablet, a desktop computer, a laptop computer, or a mainframe, on which operating systems and application software are run to implement functions of the second computing device. The communication between the OMM 104 and the second computing device can be any suitable communications channel, for example, a WIFI network, a wired network, a wide area network, a Bluetooth link, or the like.

In some embodiments, the second computing device may be implemented as the RS 112. Alternatively, the second computing device may be a standalone device separate from the RS 112.

The second computing device can be configured to receive an input indicative of receipt of the labeled product. For example, after the customer labels the returned product and leaves it in the return location, a store associate may pick it up and update it in the DB1 106 as received. The customer may further receive on the first computing device 102 a first notification indicating that the in-store return is being processed after updating the DB1 106. The first notification may be sent out by the RMM 108 or the RS 112.

Further, the customer may receive on the first computing device 102 a second notification indicating the in-store return has been completed and/or the refund has been processed, when the return is finalized. The second notification may be sent out by the RMM 108 or the RS 112. Accordingly, the flags associated with the returned products are removed from the DB1 106.

Figure 2:
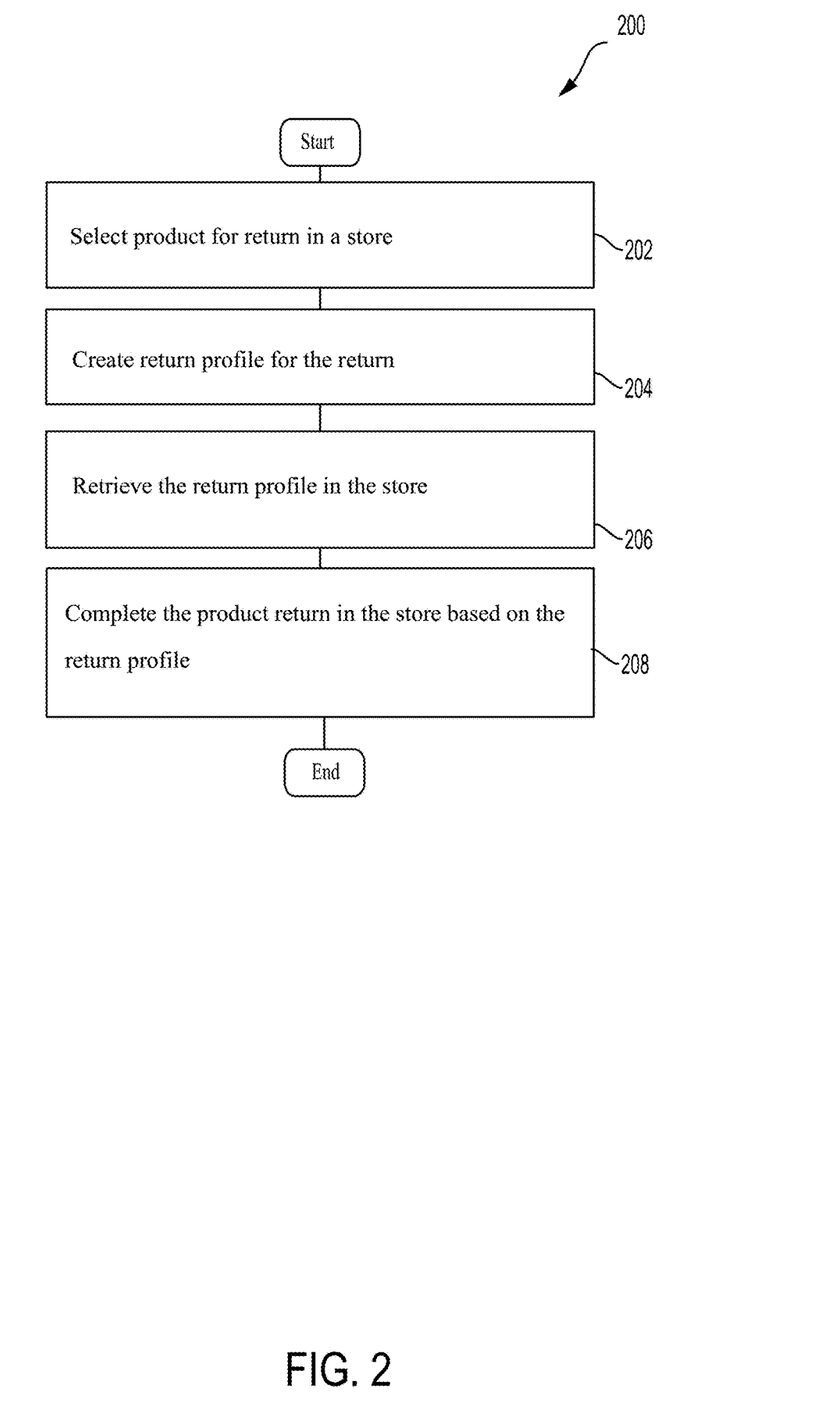
FIG. 2 illustrates a method for mobile-initiated in-store return of products according to one example embodiment.

FIG. 2 shows a flow chart of a method 200 for mobile-initiated in-store return of products according to one example embodiment. The method 200 may be implemented in the system 100 shown in FIG. 1.

In step 202, a customer selects one or more products to be returned in a store from a listing of products associated with an account of the customer. The customer may use a portable device having a mobile application installed thereon, such as a smart phone, a computing tablet, or a laptop computer. The mobile application can be an online shopping application. By logging into the mobile application using the account information (e.g., a user identification and a password), the customer may navigate to a "return" section of the mobile application, such as a "return" icon or tab. Once the "return" section is activated, the customer can access a listing of completed and pending transactions associated with his account, from which the customer is allowed to select one or more products for the return. The mobile application automatically associates the selected products with the corresponding electronic receipts.

In step 204, a return profile is created for the selected product. The return profile may include name of the selected product, purchase date, purchase time, purchase location, eligibility of the return against business rules or policy, the reason for the return, a refund method, and/or the like. The return profile may also referred to as return information of the return, and may be generated prior to the actual occurrence of the return in a store or during the actual occurrence of the return in the store. Further, the return profile may be stored on a database, such as DB2 110 in FIG. 1.

In step 206, the return profile is retrieved in the store. When the customer comes to the store to return the selected product, the return profile can be retrieved, for example by the RS 112 from the DB2 110 via RMM 108. The return profile may be further validated against the business rule and/or policy in the store.

In step 208, the return is completed in the store based on the return profile. Once the return profile is verified, the return is processed and completed. The refund may be paid according to the refund method set forth in the return profile.

Figure 3:
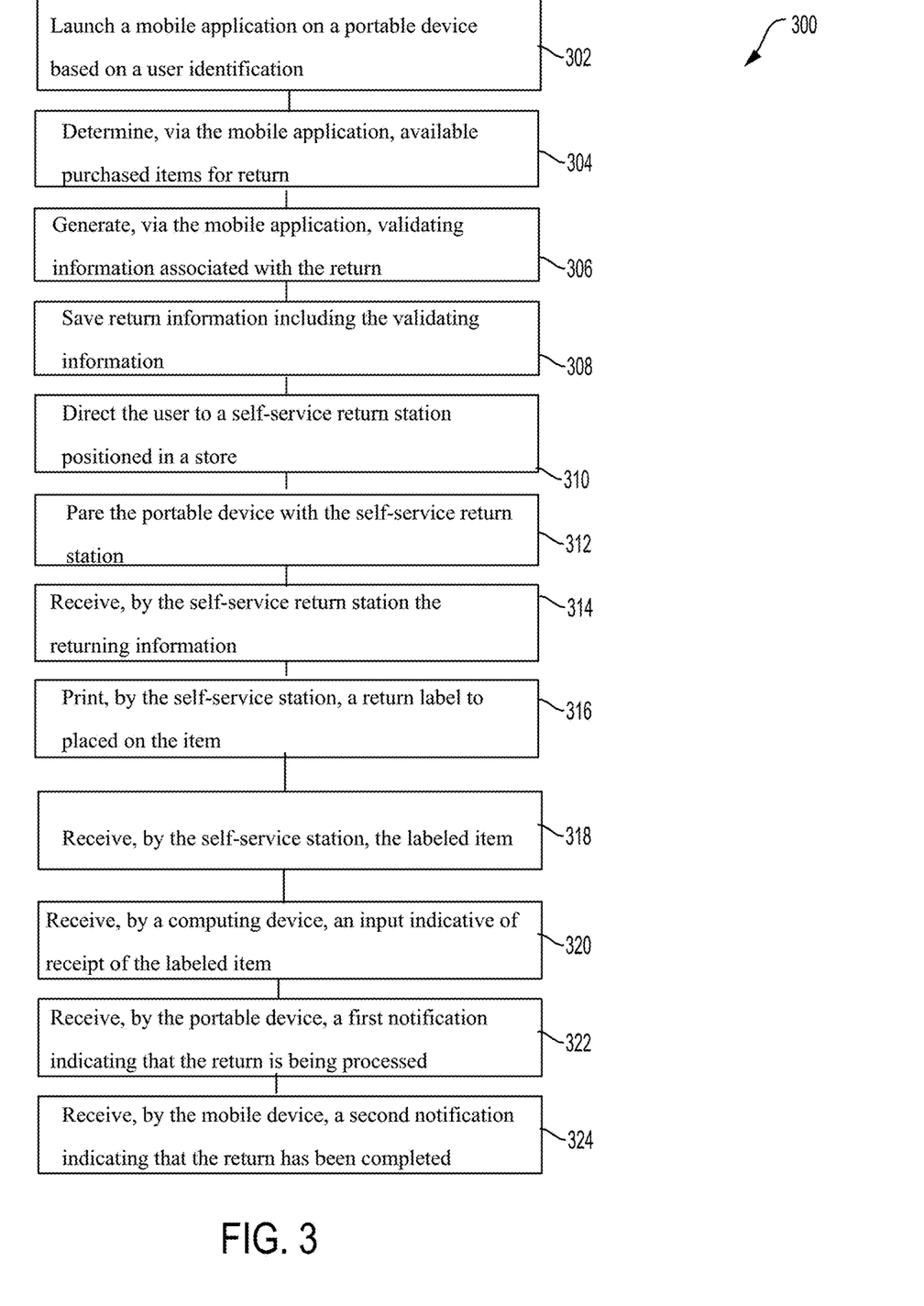
FIG. 3 illustrates a method for mobile-initiated in-store return of products according to another example embodiment.

FIG. 3 shows a flow chart of a method 300 for mobile-initiated in-store return of products via a mobile application based on user identification and electronic receipts according to one example embodiment. The method 300 may be implemented in the system 100 shown in FIG. 1.

In step 302, the mobile application is launched by a user on a portable device using the user identification. The portable device may include, but is not limited to, a smart phone, a computing tablet, or a laptop computer. The user can use the mobile application to conduct online and/or in-store shopping such that electronic receipts are automatically associated with the user's transactions and stored into the user's account in such as DB 1 106 of FIG. 1. When the user shops in a store without using the mobile application, electronic receipts can be generated via the mobile application by scanning or photographing corresponding paper receipts, and then associate with the in-store transactions. All the online and in-store transactions and associated electronic receipts can be stored in the DB 1 106.

In step 304, available purchased items for return are determined. In the mobile application, the user can navigate to a return portion of the mobile application. Upon activating the return portion, for example by clicking on a return icon or tab, a list of items from all transactions associated with the user's account is pulled out from the DB1 106 and shown to the user for selection. The list may be displayed as a drop-down listing, a table, or a spread sheet. The list may further be filtered by the OMNI 104 or the mobile application for return eligibility according to filtering criteria. For example, only items purchased one week ago are provided. The user may configure the filtering criteria, such as "items purchased within one week", "items purchased with one month", "electronic items", "food items", "and items less than $500", and the like. The OMNI 104 may only provide items that are eligible for return. For example, food items may not be displayed to the customer because according to return rules and/or policy, food items are not allowed to be returned.

In some embodiments, upon activating the return portion, the customer is provided a search field in the mobile application where the customer can search for products to be returned. For example, the customer may enter key words in a search bar, such as "food" or "electronic" to search for the products. The customer may also enter receipt numbers in the search bar to search for the products.

The customer can select one or more products for return from return-eligible items provided in the return portion. That is, available purchased items for return are determined.

In step 306, validating information for the return is generated. Once the items for the return are selected by the user, the user may be further asked to provide some validating information via the mobile application, such as a reason for the return, what kind of refund method the user prefers, or the like. The refund method may include returning the refund back to the payment method, showing the refund as credit in the user's account, adding the refund to a gift card, depositing the refund to a bank account, and so forth.

In step 308, information about the return, referred to as return information herein, is saved via the mobile application to the user's account in, for example, the DB2 110. The return information can include the validating information, name of the selected item, purchase date and time of the selected item, purchase location of the selected item, and so on.

In some embodiments, the selected items may be updated with flags to indicate that the selected items are staged for an in-store return. The update may be performed by the RMM 108 and the OMNI 104 as shown in FIG. 1.

In step 310, the user is directed via the mobile application to a return location in a store for the in-store return of the selected items, where a return station (e.g., the RS 112) is positioned. After staging the return of the selected items, which can be performed anywhere as long as the user can access the mobile application, the user can bring the selected items to a store. Upon detecting the presence of the user in the store, the user can be directed to the return location in the store. For example, a GPS position of the portable device carried by the user is detected via the mobile application to indicate that the user enters the store. The presence of the user in the store can also be detected through a WIFI connection by the portable device to a local WIFI network in the store. The direction to the return station may be instructed via a push notification received by the portable device from the RS 112, the RMM 108, or the OMM 104 when the presence of the user in the store is detected.

In step 312, the portable device is paired with the return station. When the user arrives at the return location and approaches the return station, the user can pair the portable device via the mobile application with the return station. In some cases, the user may launch the mobile application, if not, prior to the pairing. The pairing between the portable device and the return station can be performed by, for example the local WIFI network in the store, a near field communication (NFC), or a Bluetooth communication, or by scanning a QR code on the return station. The user is verified by the return station via the pairing.

In step 314, the return station can receive the return information of the selected item. As described above, the return information is stored in the DB2 110. The return information may be transferred by the portable device via the mobile application to the return station. The return information may also directly retrieve by the return station from the DB2 110 via the RMM 108. The return information may also be received from a remote server (e.g., the server 114) who communicates with the RMM 108.

In step 316, a return label is printed out by the return station. Once the return station receives and verifies the returning information, the return station automatically prints a return label for the user to place it on the selected item.

In step 318, the labeled item is received by the return station. After labeling the item, the user may drop the labeled item into a receiving box or cabinet of the return station. The labeled item may also be placed in an area in close proximity to the return station, for example, a shelf, a cabinet, or a table positioned by the return station.

In some embodiments, the method 300 may further include a step 320. In step 320, an input is received by an additional computing device to indicate that the labeled item is received for the return. After the labeled item being placed in the return location, a store associate may come to the return location to check, and input on the computing device to indicate that the labeled item is received. And accordingly, the DB1 106 is updated to reflect that the selected items have been received in the store for the return. The additional computing device can be a standalone device separate from the device 102, the OMM 104, the RMM 108, the RS 112, and the remote server 114, or can be any one of the OMM 104, the RMM 108, the RS 112, and the remote server 114 or part thereof.

In step 322, a notification is received by the user on the portable device indicating that the in-store return is being processed. Upon updating the DB1 106, the OMM 104, the RMM 108, or the RS 112 may send out the notification to the user's portable device to notify the user of the return processing status.

Further, in step 324, an additional notification may be received by the user on the portable device indicating that the in-store return is completed. Upon completing the return, the OMNI 104, the RMM 108, or the RS 112 may send out the additional notification to the user's portable device to notify the user of the completion of the return.

In some embodiments, the OMNI 104, the RMM 108, or the RS 112 may further issue the refund for the return according to the refund method specified by the user.

In some embodiments, the return station may further receive return information for an additional item to be returned along with the selected item. The return information for the additional item was staged previously for the additional item, but the user may forget to return the additional item timely. In such case, the return station may further validate against the return rules or policy the return information for the additional item to see if the additional item is still eligible for return.

In some embodiments, the return station may have the user to stage onsite an item for return. For example, the user may decide to return another item right before coming to the store for returning the selected item. In this scenario, the return station may allow the user to generate return information onsite for another item. For example, upon verifying the user identification, the return station may present a listing of products associated with the user identification for the user to select another item to return. Once another item is selected, the return station further validates the return by applying the rules for return eligibility via communicating with the RMM 108.

If the value of the item is low, or if the item is perishable, the customer may be offered to keep the item. Otherwise, the customer may be allowed to continue the returns process on the App. Rules will determine how far the customer may proceed along the returns process. A minimal returns process will have the customer provide the transaction code (from the receipt), the product scan and a reason for returns. Rules may dictate that the process stop there and continue at the customer service desk in the store.

Figure 4:
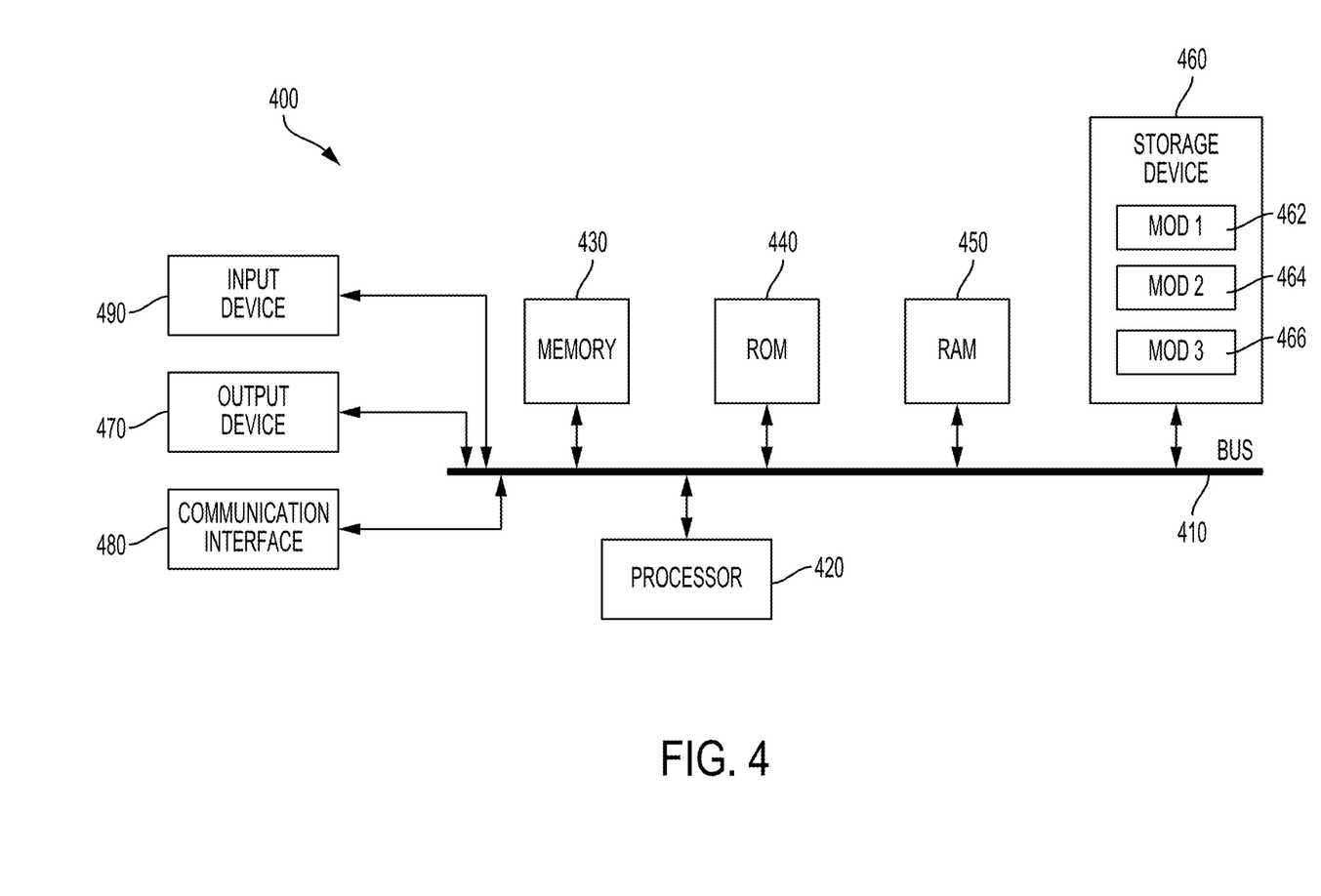
FIG. 4 illustrates an example computer system which can be used to implement the systems and methods for in-store return of products.

FIG. 4 illustrates an example computer system 400 which can be used to perform the systems for inventory monitoring as disclosed herein. The exemplary system 400 can include a processing unit (CPU or processor) 420 and a system bus 410 that couples various system components including the system memory 430 such as read only memory (ROM) 440 and random access memory (RAM) 450 to the processor 420. The system 400 can include a cache of high speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

Figure 5:
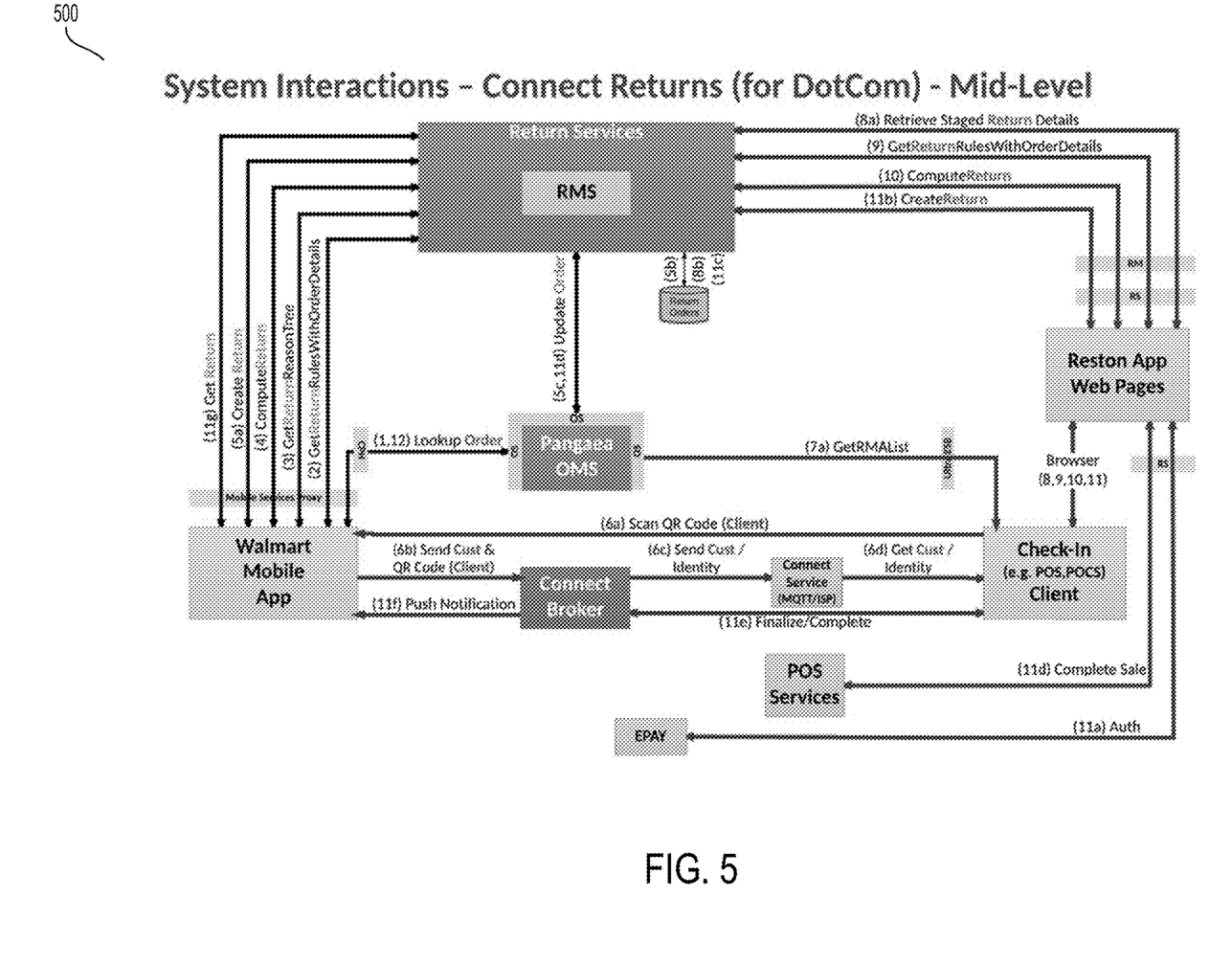
FIG. 5 illustrates a system for mobile-initiated in-store return of products according to one example embodiment.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed. FIG. 5 shows another exemplary system 500 for mobile-initiated in-store return of products according to one embodiment.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system comprising:
an order management module (OMM) configured to:
  store completed transactions and associated electronic receipts for customers in a first database; and
  store pending transactions for the customers in the first database;
a mobile device having a mobile application installed thereon and configured to:
  launch the mobile application based on a user identification;
  determine from the first database, via the mobile application, a purchased item for in-store return;
  receive from the first database, via the mobile application, an electronic receipt of the purchased item;
  associate, via the mobile application, the electronic receipt with the purchased item;
  generate from a second database, via the mobile application, validating information associated with the in-store return;
  save, via the mobile application, return information to the second database, the return information including at least one of the purchased item, the electronic receipt, or the validating information; and
  direct, via the mobile application, a user using the user identification to a return location in a store, the user returning the purchased item in the store;
a return management module (RMM) configured to:
  apply rules to validate the return based on the information about a selected product; and
  send an update to the OMM to set a flag with the selected product indicating that the return is staged;
a return station configured to:
  pair with the mobile device;
  verify the user identification;
  query the OMM for products with flags;
  filter the flags to locate the selected product;
  receive the return information from the second database via the RMM;
  print a return label to be placed by the user on the purchased item; and
  receive the purchased item having the return label placed thereon; and
a remote return service server configured to:
  retrieve the information about the return from RMM; and
  send the information about the return to the return station.

2. The system of claim 1, wherein the information about the selected product includes at least one of a purchase date, a purchase time, a purchase location, a user identification, or a payment method.

3. The system of claim 1, wherein the information about the return includes at least one of a reason for the in-store return; and a refund method.

4. The system of claim 1, wherein the mobile device is one of a smart phone, or a computing tablet.

5. A system for a mobile-initiated in-store return of a purchased item through a mobile application based on a user identification and an electronic receipt associated with the purchased item, the system comprising:
a portable device having the mobile application installed thereon and configured to:
  launch the mobile application based on the user identification;
  determine from a first database, via the mobile application, the purchased item for the in-store return;
  receive from the first database, via the mobile application, the electronic receipt of the purchased item;
  associate, via the mobile application, the electronic receipt with the purchased item;
  generate from a second database, via the mobile application, validating information associated with the in-store return;
  save, via the mobile application, return information to the second database, the return information including at least one of the purchased item, the electronic receipt, or the validating information; and direct, via the mobile application, a user using the user identification to a return location in a store, the user returning the purchased item in the store, a return station positioned in the return location in the store and configured to:
pair with the portable device;
receive the return information from the second database via a return management module; and
print a return label to be placed by the user on the purchased item;
receive the purchased item having the return label placed thereon, resulting in a labeled purchased item, and a computing device associated with the first database and configured to:
receive an input indicative of receipt of the labeled purchased item; and
update the first database to indicate that the labeled purchased item is received, wherein the portable device is further configured to:
receive, after updating the first database, a first notification indicating that the in-store return is being processed; and
receive, after the in-store return is finished, a second notification indicating that the in-store return has been completed.

6. The system of claim 5, wherein the portable device includes a smartphone, a computing tablet, and a laptop computing device.

7. The system of claim 5, wherein receive the return information includes one of:
retrieve the return information from the second database; and
retrieve the return information from the portable device.

8. The system of claim 5, wherein the validation information include at least one of:
a reason for the in-store return; and
a refund method.

9. The system of claim 5, wherein determine from the first database includes:
present a listing of products purchased via the user identification;
select the purchased product for the in-store return from the listing; and
validate the purchased product for return eligibility against a return policy.

10. The system of claim 5, wherein pair with the portable device is performed through one of: a quick response code, a near field communication, or a Bluetooth communication.

11. The system of claim 5, wherein direct a user to a return location in a store includes one of:
detect, via the mobile application, a global positioning system position of the portable device; and
detect, via the mobile application, a network connection by the portable device to a local network in the store.

12. The system of claim 5, wherein the return station is further configured to:
retrieve, from the second database, returning information for an additional purchased product to be returned by the user; and
validate the additional purchased product for return eligibility against a return policy.

13. The system of claim 5, wherein the return station is further configured to issue a refund for the labeled purchased product to an account associated with the user identification.

14. The system of claim 5, wherein the return station is further configured to:

receive a listing of products purchased associated with the user identification;
select an additional purchased product for the in-store return from the listing; and
validate the additional purchased product for return eligibility against a return policy.

15. A method implemented by a computer system for a mobile-initiated in-store return of a purchased item through a mobile application based on a user identification and an electronic receipt associated with the purchased item, the computer system comprising:
a portable device having the mobile application installed thereon,
a return station positioned in a return location in a store and, and
a computing device; and
the method comprising:
launching the mobile application based on the user identification;
determining from a first database, via the mobile application, available purchased items for the return;
receiving from the first database, via the mobile application, the electronic receipt of the purchased item;
generating from a second database, via the mobile application, validating information associated with the in-store return;
saving return information to the second database, the return information including at least one of the purchased item, the electronic receipt, or the validating information;
directing, via the mobile application, a user using the user identification to the return location in the store, the user returning the purchased item in the store,
pairing the portable device with the return station;
receiving, by the return station, the return information from the second database via a return management module;
printing, by the return station, a return label to be placed by the user on the purchased item;
receiving, by the return station, the purchased item having the return label placed thereon resulting in a labeled purchased item;
receiving, by the computing device, an input indicative of receipt of the labeled purchased item;
updating the first database to indicate that the labeled purchased item is received,
receiving by the portable device, after updating the first database, a first notification indicating that the in-store return is being processed; and
receiving by the portable device, after the in-store return is finished, a second notification indicating that the in-store return has been completed.

16. The method of claim 15, wherein receiving, by the return station, the return information includes one of:
retrieving the return information from the second database; and
retrieving the return information from the portable device.

17. The method of claim 15, wherein pairing the portable device with the return station is performed through one of: a quick response code, a near field communication, or a Bluetooth communication.

18. The method of claim 15, further comprising:
retrieving by the return station, from the second database, returning information for an additional purchased product to be returned by the user; and
validating, by the return station, the additional purchased product for return eligibility against a return policy.

19. The method of claim 15, further comprising:
issuing, by the return station, a refund for the labeled purchased product to an account associated with the user identification.

20. The method of claim 15, further comprising:
receiving, by the return station, a listing of products purchased associated with the user identification;
selecting, by the return station, an additional purchased product for the in-store return from the listing; and
validating, by the return station, the additional purchased product for return eligibility against a return policy.

* * * * *